United States Patent
Bergström et al.

(10) Patent No.: US 10,009,898 B2
(45) Date of Patent: Jun. 26, 2018

(54) METHODS AND APPARATUSES FOR ENABLING CELL ACTIVATION IN A NETWORK

(71) Applicant: Telefonaktiebolaget LM Ericsson (publ), Stockholm (SE)

(72) Inventors: Mattias Bergström, Stockholm (SE); Magnus Stattin, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 126 days.

(21) Appl. No.: 14/435,560

(22) PCT Filed: May 24, 2013

(86) PCT No.: PCT/SE2013/050597
§ 371 (c)(1),
(2) Date: Apr. 14, 2015

(87) PCT Pub. No.: WO2014/077756
PCT Pub. Date: May 22, 2014

(65) Prior Publication Data
US 2015/0305011 A1 Oct. 22, 2015

Related U.S. Application Data

(60) Provisional application No. 61/725,595, filed on Nov. 13, 2012.

(51) Int. Cl.
*H04W 72/04* (2009.01)
*H04W 76/27* (2018.01)
(Continued)

(52) U.S. Cl.
CPC ......... *H04W 72/048* (2013.01); *H04L 5/0098* (2013.01); *H04W 72/005* (2013.01);
(Continued)

(58) Field of Classification Search
None
See application file for complete search history.

(56) References Cited

U.S. PATENT DOCUMENTS

2010/0118720 A1* 5/2010 Gauvreau ........... H04W 72/048
370/252
2011/0105107 A1* 5/2011 Kwon .................. H04W 28/06
455/422.1

(Continued)

FOREIGN PATENT DOCUMENTS

| CA | 2 786 653 A1 | 7/2011 |
| WO | 2010051209 A1 | 5/2010 |

(Continued)

OTHER PUBLICATIONS

International Search Report and Written Opinion dated Mar. 21, 2014 for International Application Serial No. PCT/SE2013/050597, International Filing Date: May 24, 2013 consisting of 14-pages.

(Continued)

*Primary Examiner* — Saba Tsegaye
(74) *Attorney, Agent, or Firm* — Sage Patent Group (57) ABSTRACT

The embodiments herein relate to a method performed in a terminal, a terminal, a method performed in a network node and a network node, for supporting activation of a cell. The terminal is configured to receive a message form the network node and if the message comprises an indicator indicating whether the UE shall perform activation of the cell, the UE activates the cell upon configuration of the cell.

8 Claims, 7 Drawing Sheets

(51) Int. Cl.
  *H04L 5/00*  (2006.01)
  *H04W 72/00*  (2009.01)
  *H04W 76/04*  (2009.01)

(52) U.S. Cl.
  CPC ..... *H04W 72/0453* (2013.01); *H04W 76/046* (2013.01); *H04W 76/27* (2018.02)

(56) References Cited

U.S. PATENT DOCUMENTS

| | | | |
|---|---|---|---|
| 2011/0275374 A1 | 11/2011 | Narasimha et al. | |
| 2012/0176926 A1* | 7/2012 | Jang | H04W 24/02 370/252 |
| 2012/0178445 A1 | 7/2012 | Dalsgaard et al. | |
| 2012/0257569 A1* | 10/2012 | Jang | H04L 5/001 370/328 |
| 2012/0281544 A1 | 11/2012 | Anepu et al. | |
| 2012/0281680 A1 | 11/2012 | Boström et al. | |
| 2013/0010641 A1 | 1/2013 | Dinan | |
| 2013/0028236 A1 | 1/2013 | Jung et al. | |
| 2014/0056243 A1* | 2/2014 | Pelletier | H04W 74/04 370/329 |
| 2014/0177566 A1* | 6/2014 | Wang | H04W 72/0453 370/329 |
| 2015/0099501 A1* | 4/2015 | Kim | H04W 52/0216 455/418 |

FOREIGN PATENT DOCUMENTS

| | | |
|---|---|---|
| WO | 2011086228 A1 | 7/2011 |
| WO | 2011126276 A2 | 10/2011 |

OTHER PUBLICATIONS

Extended European Search Report and Written Opinion dated May 27, 2016 for European Regional Application Serial No. 1 385 5018.1-1854, Entry into EP Regional Phase date Apr. 28, 2015 consisting of 9-pages.

3GPP TSGRAN2#67bis Meeting, Tdoc R2-095874, Title: "The Need for Additional Activation Procedure in Carrier Aggregation", Agenda Item: 7.3.4, Source: Samsung, Document for Discussion/Decision, Conference Location and Date: Miyazaki Japan, Oct. 12-16, 2009 consisting of 4-pages.

* cited by examiner

Aggregated bandwidth of 100 MHz

FIGURE 1

Prior Art

FIGURE 2

Prior Art

FIGURE 3

Prior Art

METHODS AND APPARATUSES FOR ENABLING CELL ACTIVATION IN A NETWORK

TECHNICAL FIELD

The technology described herein relates to a user equipment or terminal, a method thereof for enabling cell activation in a network, a network node and method thereof for enabling cell activation in the network.

BACKGROUND

Figure 1:
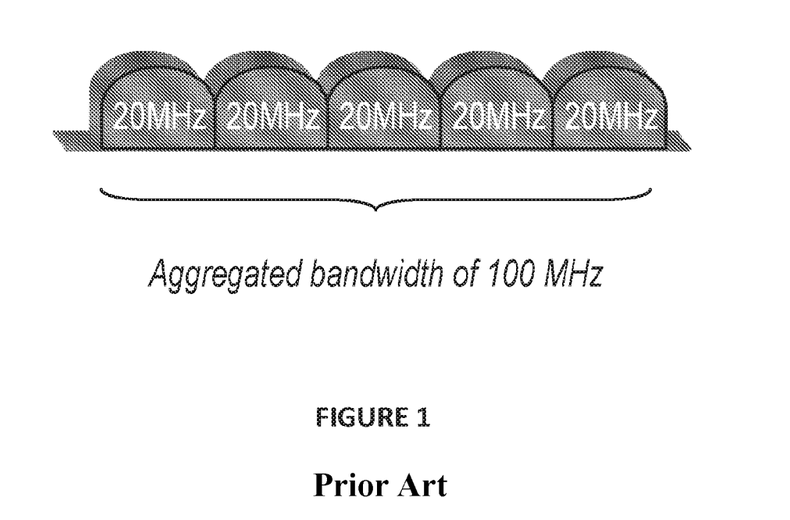
FIG. 1 is an illustrative example of an aggregated bandwidth or a CA configuration

Long Term Evolution (LTE) specifications from the $3^{rd}$ Generation Partnership Project (3GPP) support component carrier bandwidth up to 20 MHz. However, in order to meet the International Mobile Telecommunications Advanced (IMT-Advanced) requirements for (very) high data rates, the concept of carrier aggregation has been introduced to support bandwidths larger than 20 MHz. The carrier aggregation concept is illustrated in FIG. 1, where five component carriers, or cells, are illustrated, with 20 MHz of bandwidth each. In the example of FIG. 1, the total bandwidth available to a mobile terminal is the sum of the bandwidths of the cells, i.e. 100 MHz.

Note that in the context of carrier aggregation, a component carrier also refers to a cell. Hence five components carriers as illustrated in FIG. 1 correspond to five cells.

A terminal or a user equipment (UE) may be configured with a subset of the cells offered by the network and the number of aggregated cells configured for one terminal or UE may change dynamically through time based on for example terminal traffic demand, type of service used by the terminal, system load etc. A cell which a terminal is configured to use is referred to as a serving cell for that terminal. A terminal has one primary serving cell (called PCell) and zero or more secondary serving cells (SCells), the term serving cell includes both the PCell and SCells. Which cell is a terminal's PCell is terminal-specific. The PCell is considered more important and for example some control signaling is handled via the PCell. Hence in case of five components carriers as shown in FIG. 1, the terminal may have one PCell and zero, one, two, three or four SCells. As mentioned some control signalling is handled via the PCell and therefore the PCell is an important carrier for the terminal.

Aside from that the concept of configuration of cells/carriers has been introduced the concept of activation has been introduced for SCells (not for the PCell). Cells may be configured (or deconfigured) using Radio Resource Control (RRC) signaling, which can be slow, and at least SCells can be activated (or deactivated) using a Medium Access Control (MAC) control element, which is much faster. Since the activation process is based on MAC control elements—which are much faster than RRC signaling—an activation/de-activation process can quickly adjust the number of activated cells to match the number that are required to fulfil data rate needed at any given time. Activation therefore provides the possibility to keep multiple cells configured for activation on an as-needed basis.

Figure 2:
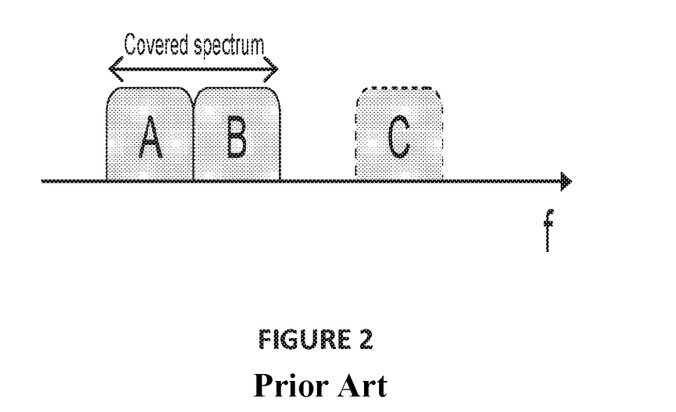
FIG. 2 is an illustrative example of configuration of cells/carriers to a terminal or UE
Figure 3:
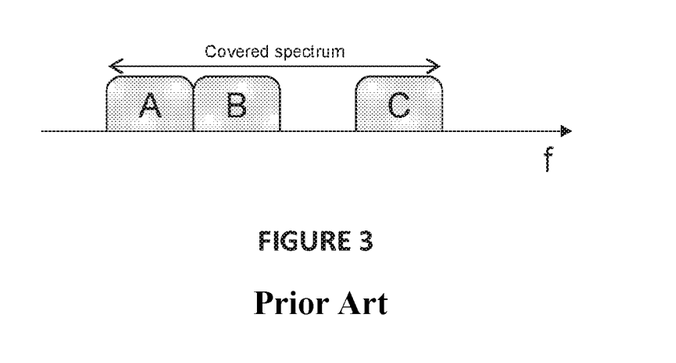
FIG. 3 is an illustrative example of another configuration of cells/carriers to a terminal or UE.

When a terminal or UE gets configured with a cell it may need to re-tune the radio frontend (RF) to cover the spectrum of the configured cell and to change the carrier frequency. Similarly, when a serving cell is deconfigured the terminal may need to re-tune the radio frontend so as to not cover the deconfigured cell. As a consequence of radio frontend re-tuning the terminal may need to perform an interruption, or glitch, during which the terminal is not able to receive of transmit signals using that radio frontend. An example is shown in FIG. 2 and FIG. 3. In the example of FIG. 2 the terminal is configured with Cell A and Cell B but not Cell C. This is indicated by "covered spectrum".

In FIG. 3, the terminal is configured with all 3 cells A, B and C. When also Cell C is configured the terminal may need to perform a radio frontend re-tuning and hence perform a glitch or interruption. Similarly with deconfiguration, if the terminal cell configuration is first as in FIG. 3 but at a later stage Cell C is deconfigured the terminal may retune the radio frontend to enter the configuration as in FIG. 2.

When a cell/carrier is activated or deactivated the terminal may also perform a glitch, similar to the case of configuration or deconfiguration.

Hence, in order for a terminal to be able to use a cell for transmission, the cell first needs to be configured for the terminal. Cell configuration may be handled on RRC level and the network or the network node is configured to send to the terminal a RRC message ordering the configuration of the cell. The terminal is required to execute the order within a delay referred to as RRC processing delay, which currently is specified to be 20 ms in case for cell configuration. After the 20 ms has passed and the terminal has performed the cell configuration, the terminal responds to the network or network node by sending an RRC message indicating that the configuration is complete.

When the network or network node has received the RRC message from the terminal indicating that the cell configuration is complete the network (node) can send to the terminal an order for activation of the cell. The terminal is required to execute the order for activation within a time period e.g. 8 ms, after which the terminal is configured to respond to the network node with an acknowledgement of the activation command. This delay is referred to as activation delay in this disclosure.

It should be noted that in case the new cell has an uplink configured and the terminal has no valid TA (Timing Advance) value for the new cell the terminal may need to perform a random access procedure to get a valid TA value for the new cell.

So the total time it takes to get a currently not configured cell ready for communication for a terminal is:

(Scheduling delay of cell configuration message)+(RRC processing delay)+(Scheduling delay for activation order message)+(activation delay)+(Scheduling delay for random access procedure order message)+(time for random access procedure)

If this total time is long it will negatively affect the user experience and network performance.

It is currently discussed in 3GPP if it is necessary to extend the activation delay. However, an extension of the activation delay leads to that the total time above becomes longer. The reason for doing so would be that the terminal may need to perform a glitch, or interruption, due to RF tuning upon cell activation during which the terminal may not be able to communicate with the network on some, or all, cells. So not only would the delay for enabling communication on a cell be extended but also it could possibly effect the communication between the terminal and the network on other cells/carriers. This would further degrade user experience and the network performance.

SUMMARY

It is therefore an object of the exemplary embodiments herein to obviate at least the problems mentioned above.

According to an aspect of the present embodiments, there is provided a method performed in a user equipment (UE) for enabling activation of a cell (or carrier). The method comprising: receiving a message from a network node; determining if the received message contains an indicator indicating whether the UE shall perform activation of the cell upon configuration and, that being the case, activating the cell upon configuration of the cell.

According to another aspect of the present embodiments, there is provided a method performed in a network node for enabling activation of a cell (or carrier). The method comprising: deciding if a UE shall perform activation of a cell upon configuration and, that being the case, signaling a message to the UE, the message containing an indicator ordering the UE to activate the cell upon configuration of the cell.

According to yet another aspect of the present embodiments there is provided a UE for enabling activation of a cell (or carrier). The UE comprising a transceiver configured to receive a message from a network node. The UE further comprising a processing circuitry configured to determine if the received message contains an indicator indicating whether the UE shall perform activation of the cell upon configuration and, that being the case, the processing circuitry is configured to activate the cell upon configuration of the cell.

According to yet another aspect of the present embodiments, there is provided a network node for enabling activation of a cell (or carrier), the network node comprising processing circuitry and a transceiver. The processing circuitry is configured to decide if a UE shall perform activation of a cell upon configuration and, that being the case, the transceiver is configured to signal a message to the UE, the message containing an indicator ordering the UE to activate the cell upon configuration of the cell.

An advantage achieved by the embodiments herein is to reduce the number of glitches or interruptions.

Another advantage is to reduce the delay for the UE (or terminal) to start communication with the network or network node using a cell.

Other advantages of the exemplary embodiments described in this disclosure will be presented in the detailed description.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, the example embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein.

Briefly described, the exemplary embodiments disclosed herein are taking advantage of that activation of a cell or a carrier is often wanted/desired to be performed as soon as the terminal or UE has configured the cell. According to an embodiment, the terminal is configured to perform activation of a cell at, upon, or shortly after, configuration of the cell. This will reduce delay for the terminal to start communicating with the network or network node using a cell/carrier as well as reduce the number of glitches or interruptions needed to be performed. By said terminal is meant a mobile station or a UE or any user device capable to connect to or operate in a wireless communication system such as LTE (Long Term Evolution) or LTE-Advanced or IMT-Advanced etc. Also when it is said network node it may be any network node in the wireless communication system for example an evolved NB (eNB) or NodeB, eNodeB or a radio base station.

Figure 4:
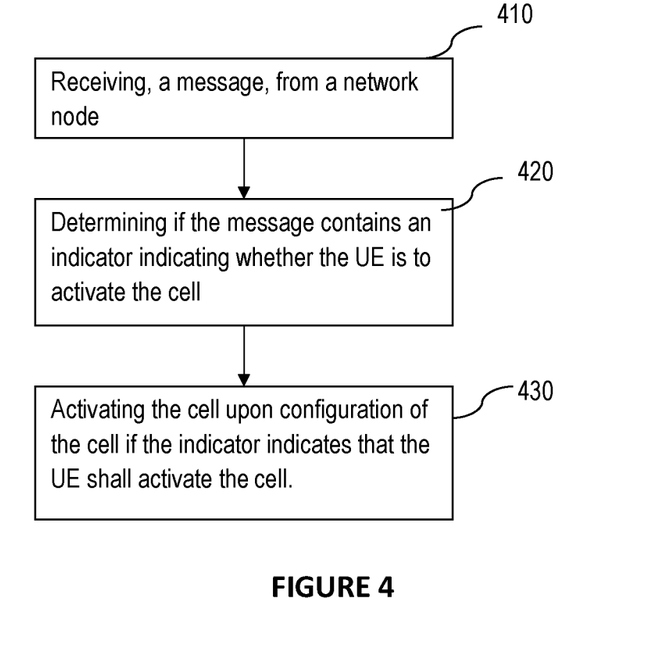
FIG. 4 is a flowchart of method, performed in a UE, according to exemplary embodiments herein.

FIG. 4 is a flow diagram depicting exemplary method steps performed by the terminal or a UE in accordance. As shown, the method comprises: receiving 410 a message from the network node; determining 420 if the received message contains an indicator indicating whether the UE or terminal shall perform activation of the cell and, that being the case, activating 430 the cell upon configuration of the cell. The received message may be a Radio Resource Control (RRC) message that includes the indicator.

As an example, when the UE receives the message, the UE identifies or determines a value of the indicator received in the RRC message acts according to the result of the identification or determination.

In an exemplary embodiment involving the context of LTE, this could for example be achieved by, the network node, including an indicator flag in RRC message used to configure (or "add") a cell. Example 1 below shows an example realization of the indicator signalled in an information element (IE) of the RRC message or cell configuration message. The indicator can be viewed as a flag. In Example 1 the indicator is called activateUponConfiguration and is comprised in IE SCellToAddMod-r10. As shown the indicator may have a BOOLEAN value. As an example if the indicator (or flag) is set by the network node to true (or 1), this indicates to the terminal or UE that it shall activate the cell upon configuration. If set by the network node to false (or 0) it is indicates to the terminal or UE that it shall not activate the cell upon configuration.

```
SCellToAddMod-r10 ::=      SEQUENCE {
    sCellIndex-r10             SCellIndex-r10,
    cellIdentification-r10     SEQUENCE {
        physCellId-r10             PhysCellId,
        dl-CarrierFreq-r10         ARFCN-ValueEUTRA
    }
                           OPTIONAL,  -- Cond SCellAdd
    radioResourceConfigCommonSCell-r10
    RadioResourceConfigCommonSCell-r10    OPTIONAL, --
Cond SCellAdd
    radioResourceConfigDedicatedSCell-r10
    RadioResourceConfigDedicatedSCell-r10    OPTIONAL, --
Cond SCellAdd2
    activateUponConfiguration    BOOLEAN,
    ...
}
```

Example 1: Example Realization of Indicator Signaled in Cell Configuration Message According to an embodiment the UE or terminal is configured to respond to the network node with a RRC message confirming that activation of the cell has been performed.

It should be noted that the indicator may be optional to include, meaning that the network node may decide not to include it when sending the cell configuration message if deemed suitable. If not included, the terminal or UE may perform a default action, e.g. refrain from cell activation upon cell configuration or perform cell activation upon cell configuration.

The opposite mapping of the values of the indicator is also possible where the value false (or 0) indicates to the terminal or UE that it shall activate the cell upon configuration and if set by the network to true (or 1) indicates to the terminal or UE that it shall not activate the cell upon configuration, however the indicator may then have a more suitable name.

Figure 5:
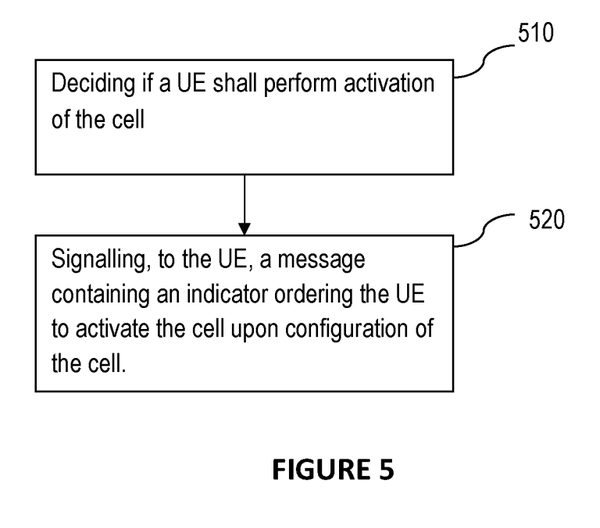
FIG. 5 is a flowchart of method, performed in a network node, according to exemplary embodiments herein.

FIG. 5 is a flow diagram depicting exemplary method steps performed by the network node in accordance with previously described embodiments. The method comprising: deciding 510 if a terminal or a UE shall perform cell activation upon configuration and, 520, that being the case, sending/signalling a message to the UE, the message containing an indicator ordering the UE to activate the cell upon configuration. The message may be a RRC message containing an indicator flag as explained above in relation to Example 1. The network node may further be configured to receive a confirmation from the terminal or UE confirming that cell activation has been performed.

The network node has therefore the freedom to decide if the terminal or UE shall, activate a cell upon configuration of that cell or not. Whether the network node wants the terminal to do so or not may depend on the scenario.

According to an exemplary scenario, the network node requests the terminal to activate a cell as soon as, or shortly after, or upon the cell or carrier has been configured in the terminal. In this context carrier aggregation is considered wherein the terminal maybe configured with a subset of cells offered by the network and the number of aggregated cells may change dynamically based on e.g. terminal traffic demand, type of service used by the terminal, system load etc. As explained before, the UE or terminal has one primary cell, PCell and zero or more secondary cells (SCells). Activation may be performed for SCell(s) and not necessarily for the PCell. The activation provides the possibility to fulfil data rate needed at any given time. Activation therefore provides the possibility to keep multiple cells configured for activation on an as-needed basis.

If, for example, high throughput and low delay are considered important the network node maybe configured to indicate, through signalling, that the terminal shall perform cell activation upon cell configuration. This means that the configured cell(s) will be available early for communication and therefore the delay is reduced and throughput increased.

According to another example, if low power consumption is considered important the network node maybe configured to indicate, through signalling, that the terminal shall not perform cell activation upon cell configuration. As an example, in LTE if the terminal has a cell activated the terminal is required to monitor the Physical Downlink Control Channel (PDCCH) of that cell which will consume terminal battery power. If the network node intends to configure a cell for a terminal but use it for data traffic at a later point in time, the network node maybe configured to indicate to the terminal that the terminal shall not perform cell activation upon cell configuration. Unnecessary power waste of having the cell activated but not used can thereby be avoided.

Several alternatives for signalling/sending/transmitting said indicator(s) will now be described in some examples.

According to an exemplary embodiment, the indicator maybe broadcasted from the network node. Different network nodes may broadcast different values of this indicator. It may even be so that different cells offered by the one node are broadcasting different values of this indicator. An advantage of broadcasting the indicator is that all terminals or UEs which read/receive and/or decode the same broadcast channel will use the same value. Another advantage of this alternative is that signalling overhead may be small. If per terminal control is not important this signalling alternative may be feasible.

According to another exemplary embodiment, an indicator is transmitted/signalled to the terminal from the network node, when the terminal performs initial access to the cell/network. This allows the network to signal/transmit/send different indicator values to different UEs. In case not all UEs are capable of performing cell activation upon cell configuration it may be necessary for the network node to signal different values to different UEs. It will with this signalling alternative also be possible to have terminal specific/dedicated signaling which may, for example, be used by the network node to deliver different quality of service for different UEs. For example, the network node may indicate to a high priority terminal to perform cell activation upon cell configuration while a low priority terminal shall not. Another scenario is that the network node is configured to take into consideration performance regarding, for example, delay, and throughput and power consumption of the terminal when deciding which value to indicate to a terminal. If low delay and high throughput is considered important for one terminal the network node may indicate to that terminal that it shall perform cell activation upon cell configuration. While for another terminal, or the same terminal in another situation, low power consumption may be more important and the network node may therefore indicate to the terminal that it shall not perform activation upon configuration.

As mentioned earlier, the network node may be configured to signal/send the indicator on a per need basis. For example, if a terminal initially does not require high throughput and may not be configured with carrier aggregation the network node may therefore refrain from signalling this indicator to this terminal. If the terminal's data traffic situation later changes it may be suitable for it to be configured with multiple carriers. At this later stage the network node may then send the indicator to the terminal indicating that the terminal shall perform cell activation upon cell configuration.

Also this alternative allows for terminal specific/dedicated indicators which bring the benefits as described in the previous example embodiment. On top of terminal specific indicators this signalling alternative also allows to change the indicator depending on the current situation, i.e. it can be changed over time. If the network node has first signalled that a terminal shall perform cell activation upon cell configuration it may at a later stage be signalled the opposite if the later situation dictates so.

According to another exemplary embodiment the eNB or network node is configured to signal the indicator in the same message, or in a compound message, as the message which orders cell configuration. This signaling alternative is flexible as the network node may control if a terminal or UE shall perform cell activation upon cell configuration each time a cell is configured. With this signalling alternative the network node or eNB may send/signal one message containing orders for configurations of multiple cells while only order activation upon configuration of a subset of these multiple cells. One example use case for this is when the network node orders configuration of multiple cells in a proactive manner while currently only a subset of these cells shall be used for communication as dictated, for example by the terminal's current traffic situation, and therefore the terminal shall (only) perform activation upon configuration on that subset of cell(s).

Also this alternative allows for terminal specific/dedicated indicators and situation dependent indicators which bring the benefits as described earlier.

According to yet another exemplary embodiment, a combination of multiple signalling alternatives is supported. In other words, multiple of the above mentioned signalling alternatives may be supported. The terminal or UE may be configured to have different priorities for the different signalling alternatives. One foreseen alternative is that the below priority order is used where the value 1) indicates highest priority and the value 4) the lowest priority:
 1) Indicator signaled/transmitted in cell configuration message
 2) Indicator signaled/transmitted on demand
 3) Indicator signaled/transmitted during initial access
 4) Broadcasting of indicator It should be mentioned that some delay may be allowed from the time when the message ordering configuration of a cell is received by the terminal until the terminal have carried out the configuration. When herein is referred to the time of configuration it should be appreciated that this time may refer to the time when the terminal:
 1. has successfully decoded the message ordering configuration of the cell. The benefit of this alternative is that the cell gets activated early. However, for some terminal architecture the cell may not be able to reach the activated state before it has completely been configured.
 2. is configured to perform the cell configuration. As it was explained in the background section the terminal is according to current LTE specification given a window of 20 ms from that the order for configuration is received until the terminal must have carried out the cell configuration. It should be mentioned that this value 20 ms is currently under discussion in 3GPP and may be changed. One terminal may be faster in configuring a cell while another terminal may be slower. The benefit of this alternative is that the terminal is configured to activating a cell as soon as the cell has been configured. A high end terminal may be able to perform cell configuration faster than a low end terminal and therefore the high end terminal can benefit from performing activation earlier than the low end terminal.
 3. is configured to respond with the RRCConnectionReconfigurationComplete message. One of the benefits foreseen with this alternative is that the network node will know when the terminal has performed the activation of the cell, which may be wanted in some situations.

According to an embodiment, the time of activation is an offset time of the time of configuration. The reason for this offset is that the terminal may need some time from that a cell has been configured until that the cell can be activated. For example, the terminal may be required to successfully receive the newly configured cell's control channels before the cell can be activated and the terminal may need some time to tune its receiver to successfully receive the control channels of the newly configured cell. Therefore the offset may be used to ensure that the terminal has completed all tasks necessary to perform activation of the newly configured cell.

It may be so that not all UEs are able to perform cell activation upon cell configuration depending on capabilities of a UE. For example, some UEs may need to perform measurements, monitor control channels, tune the radio to receive synchronization channels for a non-negligible time before the cell can be activated. In this exemplary embodiment the terminal indicates to the network if it is capable of performing cell activation upon cell configuration as described in the above sections. Hence, the network node may consider the capability of a terminal when deciding which value the indicator shall have or whether the indicator shall be signaled or not.

As an example, to a terminal capable of cell activation upon cell configuration the network node may indicate that the terminal shall perform cell activation upon cell configuration.

As an example, to a terminal not capable of cell activation upon cell configuration the network node may indicate that the terminal shall not perform cell activation upon cell configuration or the network may refrain from sending the indicator. A non-capable terminal may ignore the value indicated by the network, i.e. even if the indicator indicates to a non-capable terminal that it shall perform cell activation upon cell configuration the terminal ignores the indicator.

There are several benefits of cell activation upon cell configuration. First, if the terminal is configured to activate a cell upon configuration of the cell there is no need for the network node to send to the terminal an order for activation to render the cell activated. Note also that for such an activation command the terminal may need to respond with an acknowledgement confirming the reception of the activation order. Both these messages may therefore be avoided.

Secondly, in case cell activation is achieved by an order for activation sent to the terminal by the network node, it may need to be sent to the terminal after the terminal has successfully configured the cell and the terminal has responded to the network with an acknowledgment, e.g. an RRCConnectionReconfigurationComplete message in LTE.

In case the terminal or UE performs cell activation upon cell configuration the terminal or UE will be configured to perform only one RF retuning. Compare this to the case when the terminal first performs cell configuration, upon which the terminal will in some cases perform a RF retuning, and later at cell activation another RF retuning is needed. If the terminal performs cell activation upon cell configuration the terminal will only perform one RF retuning and hence one glitch. As a glitch may affect other cells in the terminal than the cell which is activated/deactivated and configured/deconfigured for the terminal, possibly the terminal's PCell, it important to reduce the number of glitches.

Figure 6:
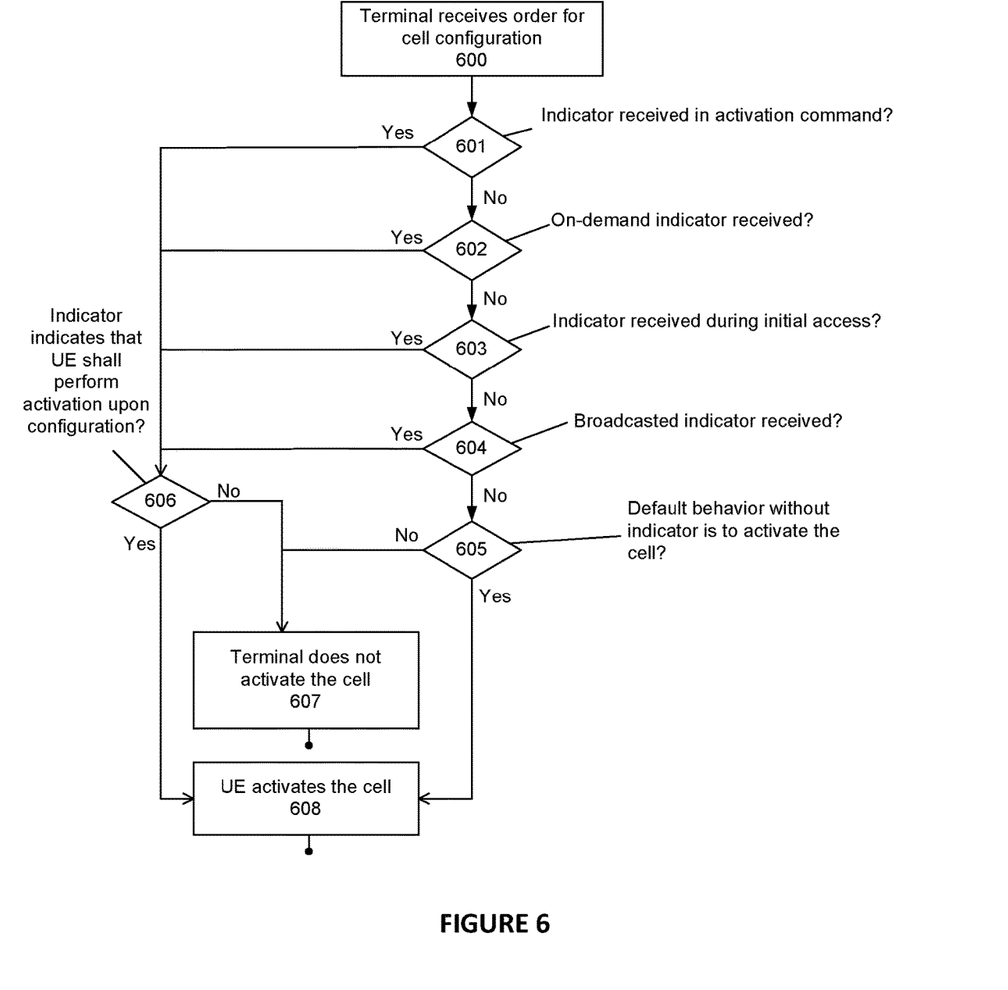
FIG. 6 is a flowchart illustrating example operations, according to some exemplary embodiments presented herein.

FIG. 6 depicts example operations, according to some exemplary embodiments presented herein. As shown, the terminal is configured to receive 600 an order for cell configuration from a network node. As shown, different alternatives are possible upon reception of the order. For each alternative it is determined whether or not the received order contains an indicator.

If an indicator is received in an activation command e.g. a configuration command (or a configuration message) 601, the terminal determines whether the indicator indicates that the terminal shall perform activation of the cell upon configuration 606. If so, the terminal activates the cell 608 upon configuration, otherwise, it does not 607.

If, instead, an on-demand indicator is received 602, the terminal determines whether the indicator indicates that the terminal shall perform activation of the cell upon configuration 606. If so, the terminal activates the cell 608 upon configuration, otherwise, it does not 607

If, instead, an indicator is received during initial access 603, the terminal determines whether the indicator indicates that the terminal shall perform activation of the cell upon configuration 606. If so, the terminal activates the cell 608 upon configuration, otherwise, it does not 607.

If, instead, an indicator is broadcasted 604, the terminal determines whether the broadcasted indicator indicates that the terminal shall perform activation of the cell upon configuration 606. If so, the terminal activates the cell 608 upon configuration, otherwise, it does not 607.

If no indicator is received in the order, a default behaviour may be performed 605, to activate the cell upon configuration or not as shown in FIG. 6.

It should be noted that the exemplary embodiments herein are not restricted to the different scenarios described in relation to FIG. 6. For example, the presence of the indicator in the message received from the network node may per see be enough for the UE to activate the cell upon configuration of the cell. In another example, if the indicator is absent or is not received from the network, the UE does not activate the cell.

Figure 7:
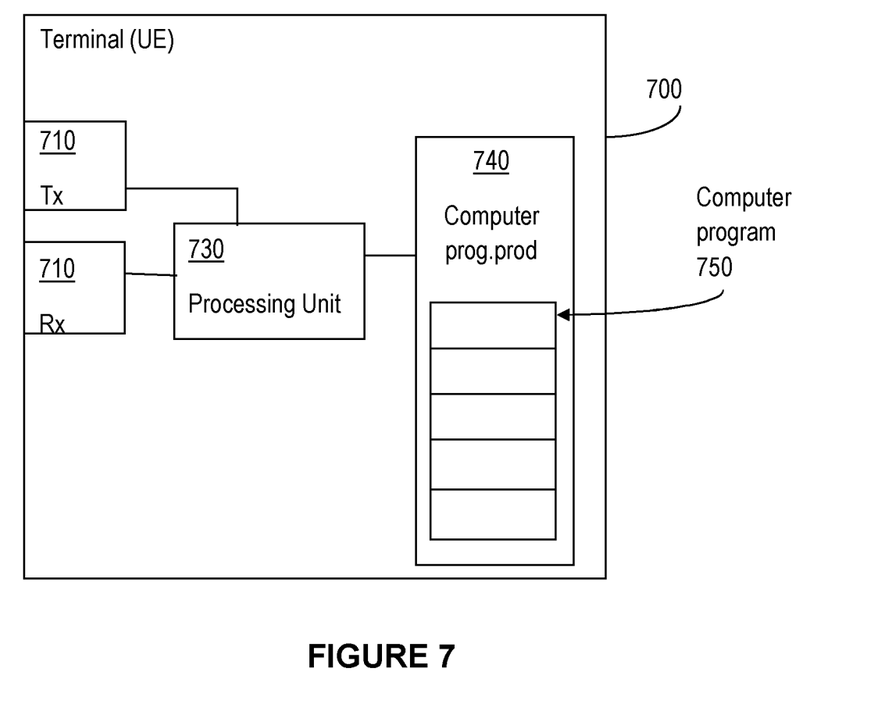
FIG. 7 is a block diagram illustrating an example of a terminal or a UE according to an exemplary embodiment.

FIG. 7 is an example configuration of a UE or terminal 700 according to some of the example embodiments presented herein. The example UE 700 is shown comprising processing circuitry 730, radio circuitry 710 Rx/Tx. The UE 700 may further comprise a memory (not shown) and at least one antenna (not shown) connected to Rx/Tx. The radio circuitry may comprise RF circuitry and baseband processing circuitry (not shown). In embodiments, some or all of the functionality described above as being provided by mobile communication devices or other forms of wireless device may be provided by the processing circuitry 730 executing instructions or a computer program 750 stored on a computer-readable medium of a computer program product 740. Alternative embodiments of the UE may comprise additional components responsible for providing additional functionality, comprising any of the functionality identified above and/or any functionality necessary to support the example embodiments described herein.

It should be appreciated that the processing circuitry (or any other hardware and/or software unit configured to execute operations and/or commands) of the UE may be configured to perform the previously described embodiments.

In summary, the UE or terminal 700 is configured to enabling activation of a cell at, or shortly after, configuration of the cell/carrier. The terminal or UE 700 comprises the transceiver circuitry 710 configured to receive/obtain/acquire, a message from a network node; the processing circuitry 730 is configured to determine if the received message contain at least one indicator indicating to the terminal/UE if/whether the terminal shall perform activation of a cell and that being the base the processing circuitry 730 is configured to activate the cell upon configuration of the cell. The processing circuitry 730 configured may further be configured to identify or determine a value of at the at least one indicator and further configured to act as a result of the identification or determination.

As previously described, the received message may be a RRC message containing an indicator flag corresponding to the indicator. Such indicator flag may be part of an IE, as shown in previously described Example 1. Also, the UE 700 may further be configured to respond to the network node with an RRC message confirming that activation of the cell has been performed.

Other operations performed by the UE have already been described and need not be repeated.

Figure 8:
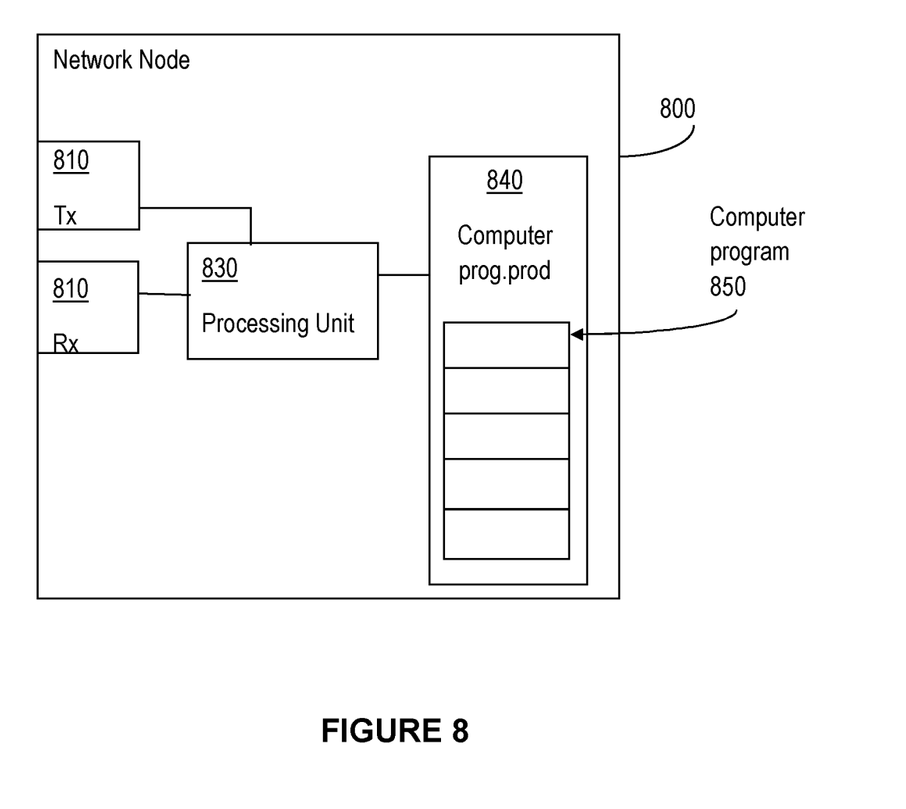
FIG. 8 is a block diagram illustrating an example of a network node according to an exemplary embodiment.

FIG. 8 is an example configuration of a network node 800 (eNB or eNodeB or NodeB) according to some of the example embodiments presented herein. The example network node 800 comprises processing circuitry 830, a memory (not shown), radio circuitry 810 Rx/Tx or transceiver, and at least one antenna (not shown) connected to Rx/Tx. The radio circuitry may comprise RF circuitry and baseband processing circuitry (not shown). In embodiments, some or all of the functionality described above as being provided by the processing circuitry 830 executing instructions or a computer program 850 stored on a computer-readable medium of a computer program product 840. Alternative embodiments of the network node 800 may comprise additional components responsible for providing additional functionality, comprising any of the functionality identified above and/or any functionality necessary to support the example embodiments described herein.

It should be appreciated that the processing circuitry (or any other hardware and/or software unit configured to execute operations and/or commands) of the network node may be configured to perform the previously described embodiment.

In summary, the network node comprises the transceiver circuitry 810 which is configured to decide if a terminal or UE shall perform a cell activation and, that being the case, the transceiver 810 is configured to send/signal at least one indicator to the terminal indicating if the terminal shall perform cell activation. The indicator is sent in a message ordering the UE to activate the cell. The message may be a RRC message including an indicator flag as previously described. Also, the network node 800, by means of the transceiver 810, may be configured to receive a confirmation from the UE e.g. a RRC message confirming that activation of the cell has been performed. As previously described, the network node may broadcast the message or send a message during initial access of the UE to the cell.

Other operations performed by the network node have already been described and need not be repeated.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The invention claimed is:

1. A method performed in a user equipment, UE, for enabling activation of a cell, the UE supporting a plurality of signaling alternatives, the method comprising:

receiving a message from a network node, the message being received according to a priority of the plurality of signaling alternatives, the priority of signaling alternatives including a cell configuration message having a higher priority than an on-demand transmission;

determining if the received message contains an indicator indicating whether the UE shall perform activation of the cell; and activating the cell upon configuration of the cell if it is determined that the received message contains the indicator indicating that the UE shall perform activation of the cell.

2. The method of claim 1, wherein the received message is a radio resource control, RRC, message containing an indicator flag corresponding to said indicator.

3. The method of claim 2, further comprising responding to the network node with an RRC message confirming that activation of the cell has been performed.

4. The method of claim 1, wherein an order of the priority is as follows: a cell configuration message, transmission on demand, transmission during initial access, and broadcast signaling.

5. A user equipment, UE, for enabling activation of a cell, the UE supporting a plurality of signaling alternatives, the UE comprising:

a transceiver configured to receive a message from a network node, the message being received according to a priority of the plurality of signaling alternatives, the priority of signaling alternatives including a cell configuration message having a higher priority than an on-demand transmission;

processing circuitry configured to determine if the received message contains an indicator indicating whether the UE shall perform activation of the cell; and the processing circuitry being configured to activate the cell upon configuration of the cell if it is determined that the received message contains the indicator indicating that the UE shall perform activation of the cell.

6. The UE of claim 5, wherein the received message is a radio resource control, RRC, message containing an indicator flag corresponding to said indicator.

7. The UE of claim 6, wherein the UE is further configured to respond to the network node with an RRC message confirming that activation of the cell has been performed.

8. The UE of claim 5, wherein an order of the priority is as follows: a cell configuration message, transmission on demand, transmission during initial access, and broadcast signaling.

* * * * *